US011524668B2

(12) United States Patent
Reize et al.

(10) Patent No.: US 11,524,668 B2
(45) Date of Patent: Dec. 13, 2022

(54) METHOD FOR OPERATING A BRAKE SYSTEM OF A MOTOR VEHICLE, BRAKE SYSTEM, MOTOR VEHICLE

(71) Applicant: Robert Bosch GmbH, Stuttgart (DE)

(72) Inventors: Andreas Reize, Adelsheim (DE); Dino Harrer, Markgroningen (DE); Stefan Epple, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 736 days.

(21) Appl. No.: 16/538,357

(22) Filed: Aug. 12, 2019

(65) Prior Publication Data

US 2020/0122705 A1 Apr. 23, 2020

(30) Foreign Application Priority Data

Oct. 18, 2018 (DE) .......................... 102018217806.2

(51) Int. Cl.
*B60T 13/62* (2006.01)
*B60T 8/17* (2006.01)
*B60T 17/22* (2006.01)
*B60T 8/40* (2006.01)
*B60T 13/16* (2006.01)
*B60T 8/32* (2006.01)
(Continued)

(52) U.S. Cl.
CPC ................ *B60T 13/62* (2013.01); *B60T 7/12* (2013.01); *B60T 8/17* (2013.01); *B60T 8/321* (2013.01); *B60T 8/404* (2013.01); *B60T 8/4054* (2013.01); *B60T 8/4059* (2013.01); *B60T 13/165* (2013.01); *B60T 13/662* (2013.01); *B60T 17/22* (2013.01); *B60T 11/20* (2013.01); *B60T 2250/04* (2013.01); *B60T 2270/88* (2013.01)

(58) Field of Classification Search
CPC .......... B60T 8/17; B60T 8/321; B60T 8/3275; B60T 8/404; B60T 8/4054; B60T 8/4059; B60T 13/146; B60T 13/161; B60T 13/165; B60T 13/62; B60T 13/662; B60T 2270/88; B60T 11/20; B60T 17/22; B60T 2250/04; B60T 2201/03; B60T 7/042; B60T 7/12
USPC ......................................................... 701/70
See application file for complete search history.

(56) References Cited

U.S. PATENT DOCUMENTS 9,199,618 B2 * 12/2015 Drumm ................. B60T 8/4077
2005/0110343 A1 * 5/2005 Gronau .................... B60T 8/442
303/116.2
(Continued)

FOREIGN PATENT DOCUMENTS

AU 2011201454 A1 * 4/2011 ............... F03B 13/14
CA 2357207 C * 7/2007 ............ B60T 13/662
(Continued)

*Primary Examiner* — Atul Trivedi
(74) *Attorney, Agent, or Firm* — Norton Rose Fulbright US LLP; Gerard Messina

(57) ABSTRACT

A method is provided for operating a motor vehicle brake system that includes an actuatable brake master cylinder, a hydraulic brake booster, and at least one brake circuit that has at least one hydraulically actuatable wheel brake and at least one hydraulic-pressure generator driven by electric motor. The method includes monitoring a state of actuation of the brake master cylinder is monitored, and, upon detecting a maximum state of actuation, activating the hydraulic-pressure generator to increase the hydraulic pressure adjusted by the brake master cylinder in the brake circuit.

16 Claims, 1 Drawing Sheet

(51) Int. Cl.
*B60T 13/66* (2006.01)
*B60T 7/12* (2006.01)
*B60T 11/20* (2006.01)

(56) References Cited

U.S. PATENT DOCUMENTS

| | | | | |
|---|---|---|---|---|
| 2008/0224533 A1* | 9/2008 | Nakada | | B60T 8/4059 |
| | | | | 303/10 |
| 2008/0255744 A1* | 10/2008 | Yasui | | B60T 13/686 |
| | | | | 701/70 |
| 2012/0226402 A1* | 9/2012 | Minamiura | | B60L 7/18 |
| | | | | 180/65.21 |
| 2013/0035835 A1* | 2/2013 | Hachtel | | B60T 8/94 |
| | | | | 701/33.9 |
| 2013/0181506 A1* | 7/2013 | Weiberle | | B60T 13/66 |
| | | | | 303/2 |
| 2014/0306514 A1* | 10/2014 | Foitzik | | B60T 8/4072 |
| | | | | 303/6.01 |
| 2014/0319902 A1* | 10/2014 | Benzler | | B60T 13/662 |
| | | | | 303/6.01 |
| 2015/0298670 A1* | 10/2015 | Ullrich | | B60T 8/3655 |
| | | | | 303/155 |
| 2015/0307073 A1* | 10/2015 | Kunz | | B60T 13/686 |
| | | | | 303/81 |
| 2015/0367824 A1* | 12/2015 | Betz | | B60T 8/1766 |
| | | | | 701/70 |
| 2016/0207511 A1* | 7/2016 | Ross | | B60T 8/4872 |
| 2018/0056953 A1* | 3/2018 | Kato | | B60T 13/662 |
| 2018/0065621 A1* | 3/2018 | Merkle | | B60L 50/15 |
| 2018/0086325 A1* | 3/2018 | Mannherz | | B60T 8/32 |
| 2018/0148033 A1* | 5/2018 | Mannherz | | B60T 13/145 |
| 2018/0339684 A1* | 11/2018 | Takeya | | B60T 13/686 |
| 2018/0345925 A1* | 12/2018 | Ninoyu | | B60T 13/145 |
| 2019/0016317 A1* | 1/2019 | Masuda | | B60T 8/00 |
| 2022/0169228 A1* | 6/2022 | Olsson | | B60G 11/27 |

FOREIGN PATENT DOCUMENTS

| | | | | | |
|---|---|---|---|---|---|
| CN | 109803861 B | * | 8/2021 | | B60T 13/146 |
| EP | 2580095 B1 | * | 8/2016 | | B60T 13/66 |
| FR | 3013016 A1 | * | 5/2015 | | B60T 13/52 |
| JP | 2011183921 A | * | 9/2011 | | |
| WO | WO-2009149977 A1 | * | 12/2009 | | B60T 8/1766 |
| WO | WO-2009149981 A1 | * | 12/2009 | | B60T 1/10 |
| WO | WO-2009150032 A1 | * | 12/2009 | | B60T 1/10 |
| WO | WO-2014118477 A1 | * | 8/2014 | | B60K 17/10 |
| WO | WO-2017068968 A1 | * | 4/2017 | | B60T 8/17 |
| WO | WO-2017090634 A1 | * | 6/2017 | | B60T 13/586 |
| WO | WO-2017090697 A1 | * | 6/2017 | | B60T 13/14 |
| WO | WO-2017090755 A1 | * | 6/2017 | | B60T 13/146 |
| WO | WO-2017146194 A1 | * | 8/2017 | | B60L 15/2009 |

* cited by examiner

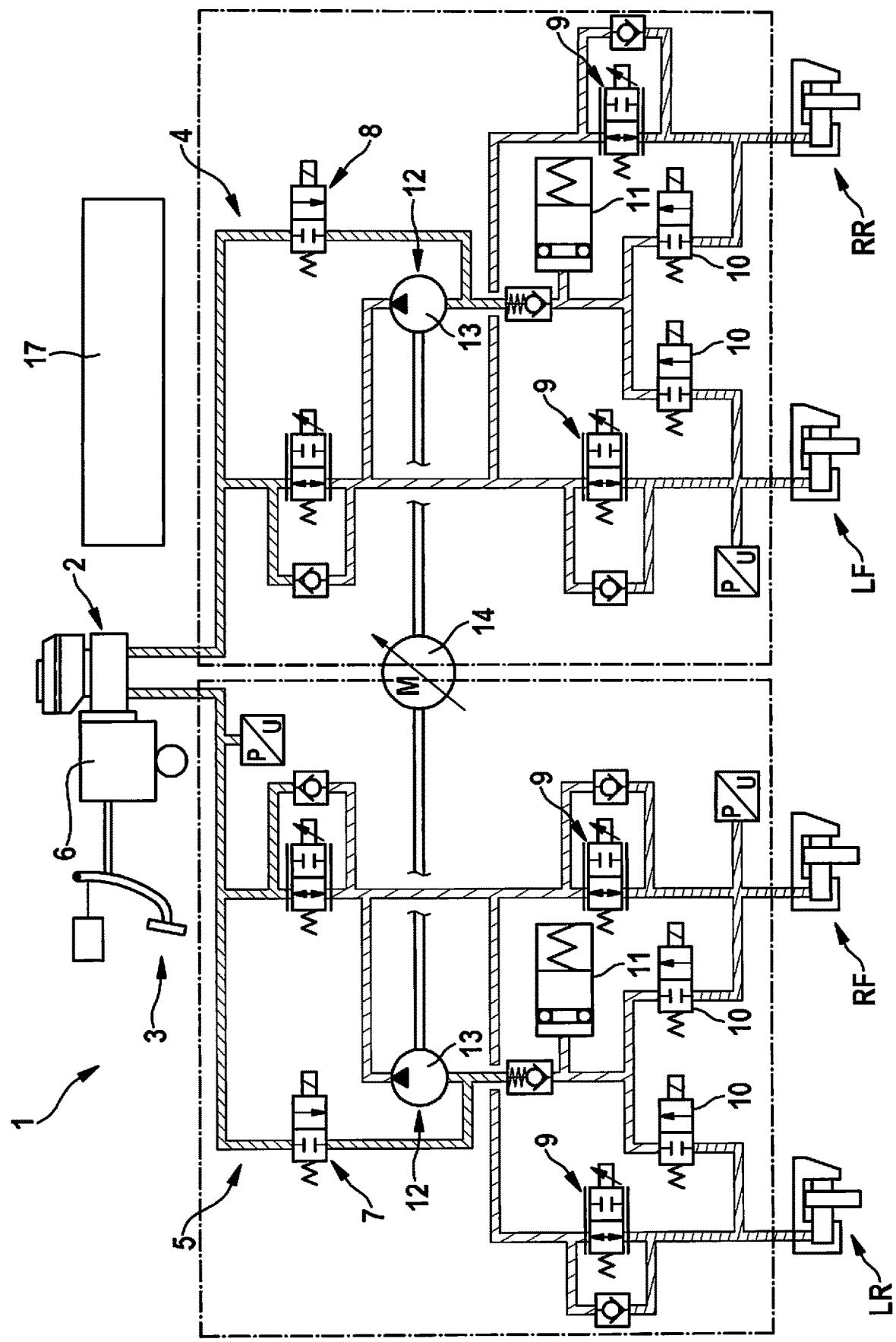

METHOD FOR OPERATING A BRAKE SYSTEM OF A MOTOR VEHICLE, BRAKE SYSTEM, MOTOR VEHICLE

CROSS-REFERENCE TO RELATED APPLICATIONS

The present application claims priority under 35 U.S.C. § 119 to DE 10 2018 217 806.2, filed in the Federal Republic of Germany on Oct. 18, 2018, the content of which is hereby incorporated by reference herein in its entirety.

FIELD OF THE INVENTION

The present invention relates to a method for operating a brake system of a motor vehicle, the brake system including an actuatable brake master cylinder, a hydraulic brake booster, and at least one brake circuit having at least one hydraulically actuatable wheel brake and at least one hydraulic-pressure generator driven by electric motor. The present invention also relates to a brake system constructed as described above, which has a control unit that carries out the described method. The present invention also relates to a motor vehicle having such a brake system.

BACKGROUND

Methods and brake systems of a motor vehicle are already familiar from the related art. The brake pressure or hydraulic pressure adjusted by a user at a brake master cylinder is boosted using a hydraulic brake booster, in order to assist the vehicle driver in operating his motor vehicle. In this context, as a rule, a brake pedal is coupled mechanically to the brake master cylinder, particularly to a hydraulic piston displaceable in the brake master cylinder, so that by actuating the brake pedal, the user displaces the hydraulic piston and thereby generates hydraulic pressure in the brake master cylinder, which is exerted on the brake system. The maximum achievable hydraulic pressure is a function of the dimensioning of the brake master cylinder as well as the formation of the brake booster. In the case of larger-dimensioned motor vehicles, hydraulic brake boosters are often used, whose maximum output is limited, subject to their design. By actuating individual valves, the hydraulic pressure generated is transmitted to wheel brakes, which then, for example, press a brake element against a brake disk that is joined in rotatably fixed fashion to a wheel of the motor vehicle, in order to decelerate the vehicle.

SUMMARY

According to an example embodiment of the present invention, a method is provided that has an advantage that if needed, the hydraulic pressure in the brake circuit is raised beyond the maximum level provided by the brake booster. This enables improved deceleration of the motor vehicle. To that end, a state of actuation of the brake master cylinder is monitored, and upon detecting a maximum state of actuation, the hydraulic-pressure generator is activated to increase the hydraulic pressure adjusted by the brake master cylinder in the brake circuit.

In particular, the state of actuation of the brake master cylinder is ascertained using a hydraulic-pressure sensor. By a simple comparison of an instantaneous hydraulic pressure, which is detected by the hydraulic-pressure sensor, to a known maximum achievable hydraulic pressure of the brake booster and/or of the brake master cylinder, the instant at which the brake master cylinder is actuated to the maximum and is unable to provide a further increase in pressure is easily ascertainable. Reliable ascertainment of the state of actuation is thereby ensured. Alternatively, for example, the position of a brake pedal is detected by sensor, in order to ascertain the state of actuation.

According to an example embodiment, the hydraulic-pressure generator is activated as a function of an instantaneous driving speed of the motor vehicle. In particular, the hydraulic-pressure generator is not activated until the driving speed has exceeded the pre-definable limit value. Namely, at low speeds, it is assumed that the hydraulic pressure provided by the brake system or the brake master cylinder is sufficient to decelerate the motor vehicle quickly enough.

It is especially preferred that the hydraulic-pressure generator is activated as a function of an instantaneous deceleration of the motor vehicle. Thus, in particular, an actual deceleration of the motor vehicle is determined and compared to a desired deceleration, which can be obtained, e.g., from the state of actuation of the brake master cylinder. If the actual deceleration deviates from the desired deceleration beyond a specific pre-definable threshold value, then the hydraulic-pressure generator is activated to further increase the hydraulic pressure.

According to an example embodiment, the hydraulic-pressure generator is activated as a function of a duration of the actuation of the brake master cylinder. Thus, specifically, in the event a pre-definable length of time is exceeded, the hydraulic-pressure generator is activated to support the brake master cylinder or the user of the motor vehicle, and to increase the deceleration torque.

Furthermore, preferably the hydraulic-pressure generator is activated to increase the hydraulic pressure the maximum amount possible. Consequently, the maximum achievable braking torque is available at the wheel brakes.

Preferably, the hydraulic-pressure generator is activated in such a way that it increases the hydraulic pressure step-by-step or continuously. As a result, the maximum achievable braking torque is not available suddenly or immediately, but rather is built up gradually or continuously by the hydraulic-pressure generator. This increases driving comfort.

Alternatively, the hydraulic-pressure generator is activated to increase the hydraulic pressure as quickly as possible, namely, to the maximum hydraulic pressure achievable.

An example embodiment of the present invention is directed to a brake system with a control unit adapted to carry out the method described herein, thereby obtaining the described advantages.

An example embodiment is directed to a motor vehicle including the described brake system, thereby obtaining the described advantages.

Further advantages and preferred features and feature combinations are derived especially from the previous description as well as from the claims. The invention is explained in greater detail below on the basis of the drawing.

BRIEF DESCRIPTION OF THE DRAWING

The FIGURE shows a simplified representation of a brake system of a motor vehicle according to an example embodiment of the present invention.

DETAILED DESCRIPTION

The FIGURE shows a simplified representation of an advantageous brake system 1 of a motor vehicle, not shown in greater detail here. Brake system 1 takes the form of a hydraulically operating brake system and has a plurality of wheel brakes LR, RF, LF and RR which are assigned to one wheel each of the motor vehicle and are hydraulically operable. In addition, brake system 1 has a brake master cylinder 2 which is able to be actuated by a driver of the motor vehicle, particularly using a brake pedal 3. In the present case, brake master cylinder 2 takes the form of what is referred to as a tandem cylinder having two hydraulic chambers, each of which is assigned one brake circuit 4, 5. Each brake circuit 4, 5 has two of wheel brakes LF, RR and LR, RF, respectively. In addition, brake master cylinder 2 is assigned a brake booster 6, which in the present case, takes the form of a hydraulic brake booster 6 and which, in a known manner, assists the driver in the operative control of brake system 1.

The hydraulic chambers of the brake master cylinder are connectable in each case by a switching valve 7, 8 to respective brake circuit 5, 4. In addition, between respective switching valve 7, 8 and associated wheel brakes LR, RF or LF, RR of respective brake circuit 5, 4, in each case a volume-control valve 9 is interposed, which regulates the hydraulic pressure acting on the respective wheel brake.

Furthermore, in each case respective wheel brake LR, RF, LF, and RR is connectable hydraulically by a discharge valve 10 to a tank storing the brake fluid or to a pressure accumulator 11. For example, in order to reduce the hydraulic pressure at the specific wheel brake, associated discharge valve 10 is actuated so that the hydraulic pressure decreases to a desired braking force or the specific wheel brake is totally released.

Moreover, brake system 1 has a controllable hydraulic-pressure generator 12 in each brake circuit 4, 5. In this case, respective hydraulic-pressure generator 12 takes the form of hydraulic pump 13 which is able to be driven by an electric motor 14. In particular, according to the present example embodiment, electric motor 14 drives both hydraulic pumps 12. On the suction side, hydraulic pumps 13 are connected to discharge valves 10 and to respective switching valve 7, 8. By activating hydraulic-pressure generator 12, the hydraulic pressure is able to be increased in respective brake circuit 4, 5 independently of the actuation of brake pedal 3.

The hydraulic pressure made available by brake master cylinder 2 is monitored by at least one hydraulic-pressure sensor 15 downstream of brake master cylinder 2. A state of actuation of brake master cylinder 2 is inferred depending on the detected hydraulic pressure. With knowledge of the data of brake booster 6 and brake master cylinder 2, the state of actuation of brake master cylinder 2 and particularly of the hydraulic piston located in it is ascertainable as a function of the detected hydraulic pressure.

The state of actuation of brake master cylinder 2 is now monitored during ongoing operation. If it is determined that a maximum state of actuation of brake master cylinder 2 is reached, at which the driver has depressed brake pedal 3 up to the limit stop, for example, and thereby is generating the maximum braking force or the maximum hydraulic pressure in brake system 1, hydraulic-pressure generators 12 are additionally activated to increase the hydraulic pressure, already adjusted by brake master cylinder 2 in brake system 1, in at least one of brake circuits 4, 5.

In this way, the driver is assisted if the maximum adjustable hydraulic pressure of brake master cylinder 2 is reached. As a consequence, the hydraulic pressure in the brake system is further increased overall, thereby permitting improved deceleration of the motor vehicle.

In particular, at least one of hydraulic-pressure generators 12 is activated as a function of an instantaneous driving speed of the motor vehicle, so that, for example, the hydraulic pressure in the brake system is not increased by hydraulic-pressure generator 12 until the driving speed has exceeded a predetermined limit value.

In addition, preferably a present actual deceleration of the motor vehicle is determined and compared to a desired deceleration. For example, the desired deceleration can be obtained from the actuation of brake pedal 3. If the actual deceleration deviates too greatly or beyond a predetermined limit value from the desired deceleration, then at least one of hydraulic-pressure generators 12 is activated to increase the hydraulic pressure to respective brake circuit 4, 5, in order to improve the deceleration.

Optionally, respective hydraulic-pressure generator 12 is activated as a function of a duration of the actuation of brake master cylinder 2.

In addition, preferably respective hydraulic-pressure generator 12 is activated in such a way that it increases the hydraulic pressure slowly step-by-step or continuously to an achievable maximum value. Alternatively, it is activated in such a way that the hydraulic pressure is increased by hydraulic-pressure generator 12 as quickly as possible to the maximum value.

While in the first case, driving comfort takes priority, in the latter case, the fastest possible deceleration of the motor vehicle is paramount.

What is claimed is:

1. A method for operating a brake system of a motor vehicle, the brake system comprising an actuatable brake master cylinder, a hydraulic brake booster, and at least one brake circuit that each includes at least one hydraulically actuatable wheel brake and at least one hydraulic-pressure generator driven by an electric motor, the method comprising:
    monitoring a state of actuation of the brake master cylinder; and
    for each of the at least one brake circuit, upon detecting a maximum of the state of actuation, activating the respective hydraulic-pressure generator of the brake circuit to increase a hydraulic pressure adjusted by the brake master cylinder in the respective brake circuit;
    wherein the method includes either or both of the following features (a)-(b):
    (a) the maximum of the state of actuation, upon detection of which the activating of the respective hydraulic-pressure generator of the brake circuit is performed, is a maximum extension of a piston located in the brake master cylinder; and
    (b) the respective hydraulic-pressure generator at least one of:
        (i) is separate from the brake booster;
        (ii) is located in a line downstream of an outlet from a fluid chamber of the brake master cylinder; and
        (iii) includes a hydraulic pump, with a pressure accumulator of the brake system being arranged at a suction side of the hydraulic pump.

2. The method of claim 1, wherein the state of actuation of the brake master cylinder is ascertained using a hydraulic-pressure sensor.

3. The method of claim 1, wherein the hydraulic-pressure generator is activated as a function of an instantaneous driving speed of the motor vehicle.

4. The method of claim 1, wherein the hydraulic-pressure generator is activated as a function of an instantaneous deceleration of the motor vehicle.

5. The method of claim 1, wherein the hydraulic-pressure generator is activated as a function of a duration of the actuation of the brake master cylinder.

6. The method of claim 1, wherein the activation of the hydraulic-pressure generator increases the hydraulic pressure a maximum amount possible.

7. The method of claim 1, wherein the activation of the hydraulic-pressure generator increases the hydraulic pressure iteratively step-by-step.

8. The method of claim 1, wherein the activation of the hydraulic-pressure generator increases the hydraulic pressure continuously.

9. The method of claim 1, wherein the activation of the hydraulic-pressure generator increases the hydraulic pressure as quickly as possible.

10. The method of claim 1, wherein the maximum of the state of actuation, upon detection of which the activating of the respective hydraulic-pressure generator of the brake circuit is performed, is the maximum extension of the piston located in the brake master cylinder.

11. The method of claim 1, wherein the respective hydraulic-pressure generator is separate from the brake booster.

12. The method of claim 1, wherein the respective hydraulic-pressure generator is located in a line downstream of an outlet from a fluid chamber of the brake master cylinder.

13. The method of claim 12, wherein the activation of the respective hydraulic-pressure generator causes the respective hydraulic-pressure generator to increase a pressure of fluid that has been output from the fluid chamber of the brake master cylinder and that is being input to one or more of the at least one hydraulically actuatable wheel brake.

14. The method of claim 1, wherein the respective hydraulic-pressure generator includes the hydraulic pump, with the pressure accumulator of the brake system being arranged at the suction side of the hydraulic pump.

15. A brake system for a motor vehicle, the brake system comprising:
an actuatable brake master cylinder;
a hydraulic brake booster;
at least one brake circuit that each includes at least one hydraulically actuatable wheel brake; and
a control unit, wherein:
the control unit is configured to:
monitor a state of actuation of the brake master cylinder; and
for each of the at least one brake circuit, upon detecting a maximum of the state of actuation, activate a respective hydraulic-pressure generator of the brake circuit to increase a hydraulic pressure adjusted by the brake master cylinder in the respective brake circuit; and
the brake system includes either or both of the following features (a)-(b):
(a) the maximum of the state of actuation, upon detection of which the activation of the respective hydraulic-pressure generator of the brake circuit is performed, is a maximum extension of a piston located in the brake master cylinder; and
(b) the respective hydraulic-pressure generator at least one of:
(i) is separate from the brake booster;
(ii) is located in a line downstream of an outlet from a fluid chamber of the brake master cylinder; and
(iii) includes a hydraulic pump, with the brake system further comprising a pressure accumulator arranged at a suction side of the hydraulic pump.

16. A motor vehicle comprising a brake system, the brake system comprising:
an actuatable brake master cylinder;
a hydraulic brake booster;
at least one brake circuit that each includes at least one hydraulically actuatable wheel brake; and
a control unit, wherein:
the control unit is configured to:
monitor a state of actuation of the brake master cylinder; and
for each of the at least one brake circuit, upon detecting a maximum of the state of actuation, activate a respective hydraulic-pressure generator of the brake circuit to increase a hydraulic pressure adjusted by the brake master cylinder in the respective brake circuit; and
the brake system includes either or both of the following features (a)-(b):
(a) the maximum of the state of actuation, upon detection of which the activation of the respective hydraulic-pressure generator of the brake circuit is performed, is a maximum extension of a piston located in the brake master cylinder; and
(b) the respective hydraulic-pressure generator at least one of:
(i) is separate from the brake booster;
(ii) is located in a line downstream of an outlet from a fluid chamber of the brake master cylinder; and
(iii) includes a hydraulic pump, with the brake system further comprising a pressure accumulator arranged at a suction side of the hydraulic pump.

* * * * *